United States Patent [19]

Muddiman

[11] Patent Number: 5,246,032
[45] Date of Patent: Sep. 21, 1993

[54] FLUID CHECK VALVE

[76] Inventor: Robert W. Muddiman, 487 Speers Road, Oakville, Ontario L6K 2G4, Canada

[21] Appl. No.: 891,199

[22] Filed: Jun. 1, 1992

[51] Int. Cl.[5] ............................................. F16K 15/03
[52] U.S. Cl. ................................................. 137/512.1
[58] Field of Search ..................................... 137/512.1

[56] References Cited

U.S. PATENT DOCUMENTS

| | | | |
|---|---|---|---|
| 3,678,958 | 7/1972 | Satterwhite | 137/512.1 |
| 4,257,444 | 3/1981 | Ogle | 137/512.1 |
| 4,694,853 | 9/1987 | Goodwin | 137/512.1 |

*Primary Examiner*—Robert G. Nilson
*Attorney, Agent, or Firm*—McFadden, Fincham, Marcus & Anissimoff

[57] ABSTRACT

A fluid check valve has a flapper assembly mounted in the bore of a valve body. The assembly has two flappers mounted on a hinge pin which is mounted at each end in holding members which fit against the bore of the valve. The hinge pin is mounted in elongate slots in the holding members which allow movement of the pin and hence the flappers along the axis of the valve. The elongate slots prevent any lateral or sideways movement of the pin. The holding members fit between the valve seat and a retaining projection or projections in the valve bore. Locating means retain the flapper assembly in position with the holding members between the seat and the projections.

11 Claims, 3 Drawing Sheets

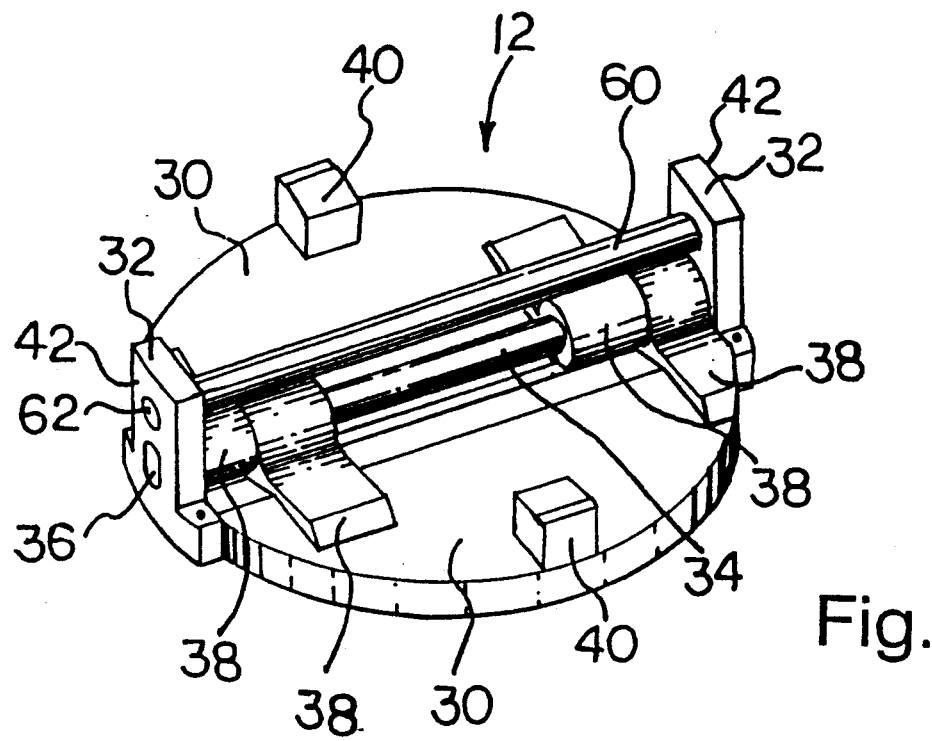
Fig. 2
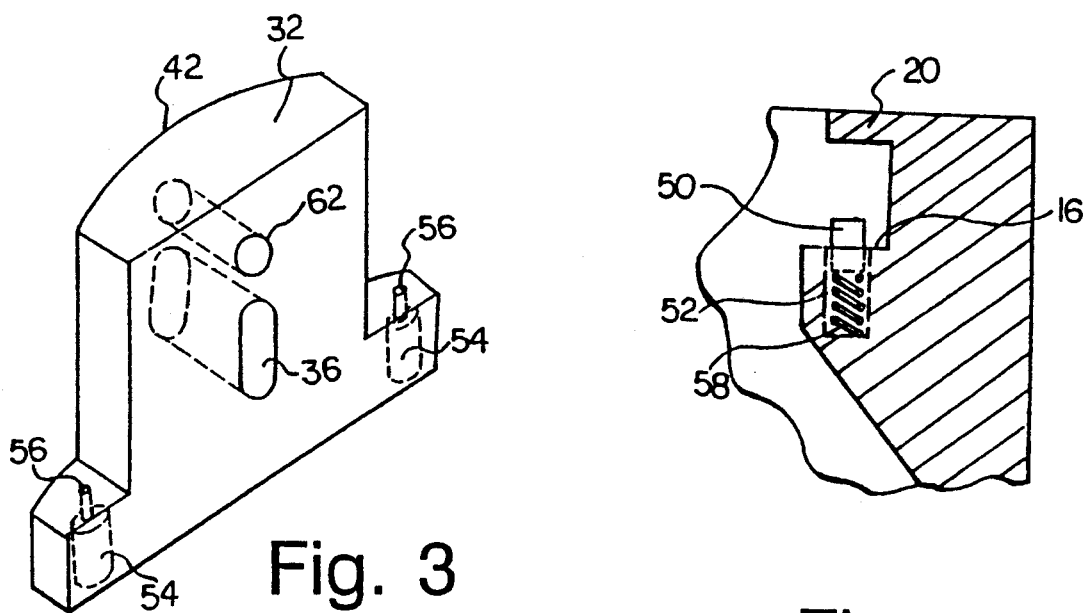
Fig. 3
Fig. 4

FLUID CHECK VALVE

This invention relates to fluid check valves, and in particular to check valves having two flappers, and sometimes referred to as a wafer check valve.

BACKGROUND OF THE INVENTION

Field of the Invention

In previous types of double flapper-type check valves, hinge and stop pins are installed through holes which extend through the wall of the valve body. After installation of the pins, the holes are sealed by plugs or other means. While initially effective, there is a possibility of leakage from the inside to the outside past the seals.

Another disadvantage of current designs is that the flappers are free to move sideways in the bore due to the need to permit downstream movement of the flappers, necessary to avoid interference of the heels of the flappers with the seat when the flappers rotate to the open position. This movement causes extra wear on the wall of the flapper hinge or bushing, depending upon actual design.

One modification made to avoid holes through the wall is to mount the pins in inserts which fit into cavities machined into the inner surface of the body wall. These inserts are retained in place by various means U.S. Pat. No. 4,694,853 describes and illustrates the various embodiments in which hinge pins and stop pins are mounted in inserts positioned in recesses in the body wall.

Although holes through the body wall are eliminated, and thus also potential leak paths, the modifications using inserts are expensive to manufacture and the design can restrict the particular type of gasket that can be used. Also, thinning of the wall occurs, which is not desirable.

The present invention avoids the need for holes through the body wall and also avoids the need to machine recesses in the body wall. Sideways movement of the valve is also eliminated. It is possible to eliminate the need for a stop pin.

Broadly, in accordance with the present invention, a fluid valve comprises a valve body having a bore therethrough, having an annular seat in the bore. A flapper assembly is positioned in the bore, and comprises a pair of substantially semi-circular flapper members, a pair of spaced holding members having elongate bores extending axially in the holding members, the outer surfaces of the holding members of the same profile as the bore in the valve body. A hinge pin is mounted at each end in the elongate bores and pivotally mounts the flapper members. Retaining means extend into the bore of the valve body, the holding members positioned between the seat and the retaining means.

In accordance with one embodiment of the invention, the retaining means comprises two diametrically opposed projections, and locating means position the flap assembly in the bore with a hinge pin aligned with the projections.

In another embodiment, the retaining means comprises a resilient member, of annular form, seated in a groove in the bore.

A stop pin may also extend between the holding members, aligned with the hinge pin, on the side remote from the seat.

The invention will be readily understood by the following description of certain embodiments, by way of example, in conjunction with the accompanying drawings.

BRIEF DESCRIPTION OF THE DRAWINGS

FIG. 2 is a perspective view of the flapper assembly of FIG. 1 in a closed condition;

FIG. 3 is a perspective view of a holding member, to a larger scale;

FIG. 4 is a cross-section on the line 4—4 of FIG. 1;

DETAILED DESCRIPTION OF THE PREFERRED EMBODIMENTS

Figure 1:
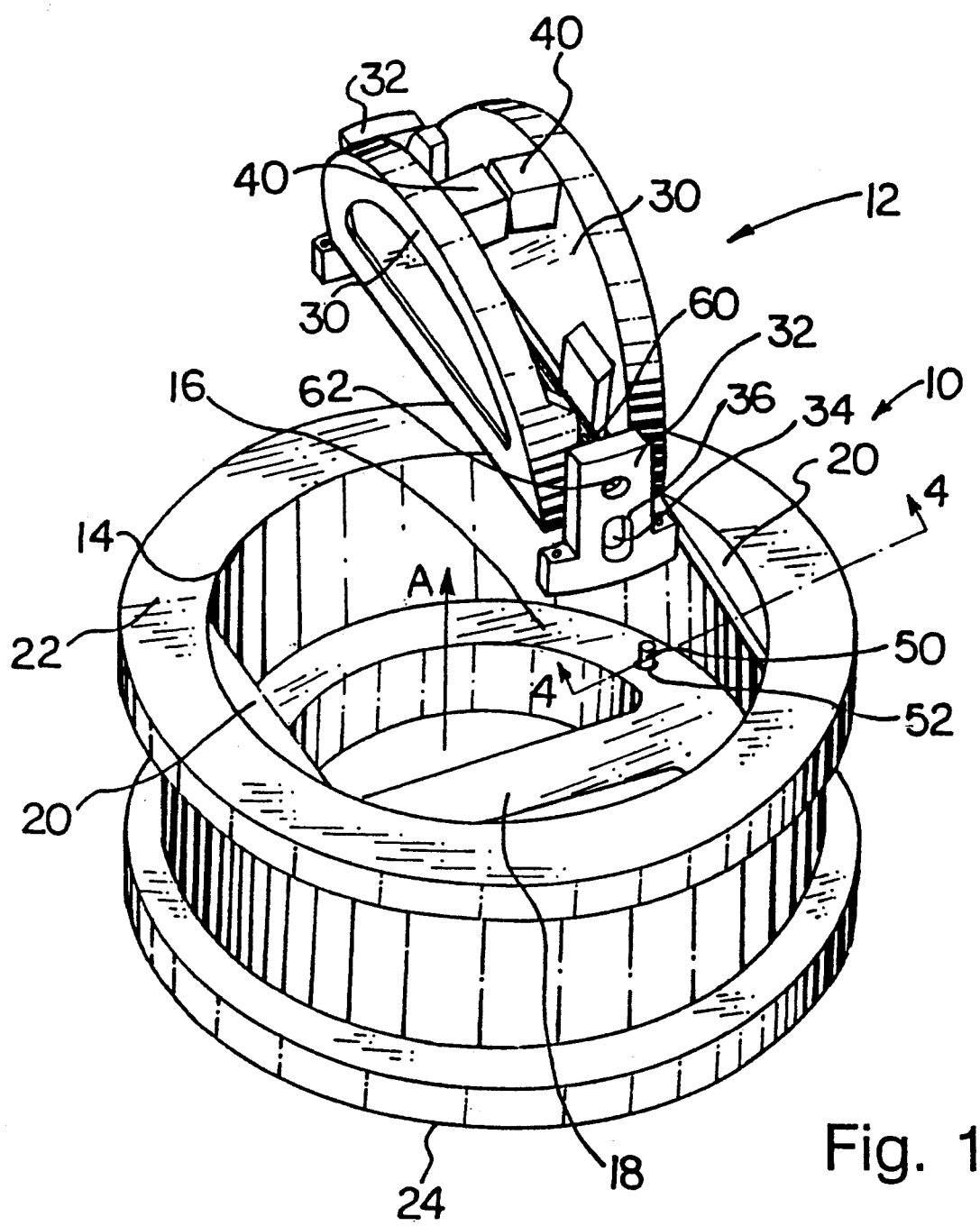
FIG. 1 is an exploded perspective view of one form of valve in accordance with the invention, the flapper assembly spaced from the body, the flapper assembly in an open condition.

FIGS. 1 to 4 illustrate one embodiment of the invention with FIG. 1 illustrating, in exploded view, a check valve comprising a body 10 and a flapper assembly 12. The body 10 has a bore 14, in which is positioned a seat 16. A web 18 extends diametrically across the bore 14, in the example being at the level of the seat.

Extending in from the bore 14 are two retaining members, in the form of projections or webs 20, diametrically opposed. The projections 20 are aligned with the web 18. Gasket surfaces 22 and 24 respectively are at each end of the valve body. When inserted in a pipe, fluid flow would normally be upwards in FIG. 1, as indicated by arrow A.

The flapper assembly 12 is seen more clearly in FIG. 2. The assembly comprises two substantially semi-circular flapper members 30, two holding members 32, and a hinge pin 34. In each holding member 32 is an elongated slot 36, the axis of the slot being parallel to the axis of the valve body. The hinge pin 34 is mounted at each end in the elongated slots, and the flapper members 30 are mounted on the hinge pin 34 and can pivot from the position shown in FIG. 2 to the position shown in FIG. 1. The flapper members are mounted on the hinge pin by bosses 38 and stops 40 can be provided. The outer surfaces 42 of each of the holding members 32 is of the same profile as that of the surface of the bore so that they will be a close fit against the wall on the valve body. Normally the bore will be circular, and the outer surfaces of the holding members 32 will also be circular.

The flapper assembly 12 is positioned in the bore 14 by holding the flapper assembly in its open position, as in FIG. 1, and inserting the assembly into the bore, the flapper assembly 12 rotated so as to clear the projections 20. Once the holding members are resting on the seat 16, the assembly is rotated to bring the holding members 32 under the projections 20. The holding members 32 are in close fit between the seat 16 and the projections 20.

To prevent rotation of the flapper assembly relative to the valve body, once assembled, some form of retaining means is desirable. In the example illustrated, one or more locating pins 50 are positioned in the seating 16. The pins are positioned in bores 52 and are spring-loaded upward, as by compression springs. In the holding members 32 bores are formed to receive the pins 50 when the flapper assembly 12 is correctly positioned.

FIGS. 3 and 4 illustrate to a larger scale a holding member 32 and also the positioning of a locating pin and a projection 20. In FIG. 3, bores 54 in the bottom surface of the holding member 32 accept the retaining pins 50. Small diameter access holes 56 are provided for pushing down the pins when it is desired to remove the flapper assembly 12. In FIG. 4, a bore 52 is indicated with a pin 50. Also shown is a compression spring 58 which biases the pin upward. At the minimum, only one pin 50 is required and only one bore 54. For convenience, even with only one pin, a bore 54 would be provided in each holding member so as to be independent of the orientation of the flapper assembly on insertion into the valve bore. Two or more pins can be provided, with suitable bores 54 in the holding members.

If it is desirable, or necessary, to ensure that the flapper members 30 do not move such that one of the flapper members moves past the vertical, a stop pin can be provided. As seen in FIGS. 1 and 2, a stop pin 60 is mounted in bore 62 in the holding member 32.

An alternative provision for limiting the opening of the flapper members, is to form projections on the inner surfaces of the holding members which the flapper members contact on opening, limiting their travel.

Instead of spring-loaded pins 50 locating the flapper assembly, other means can be provided. For example, pins could be inserted through the holding member into bores in the seat. It would be necessary to ensure that the pins could not fall out during use.

Figure 5:
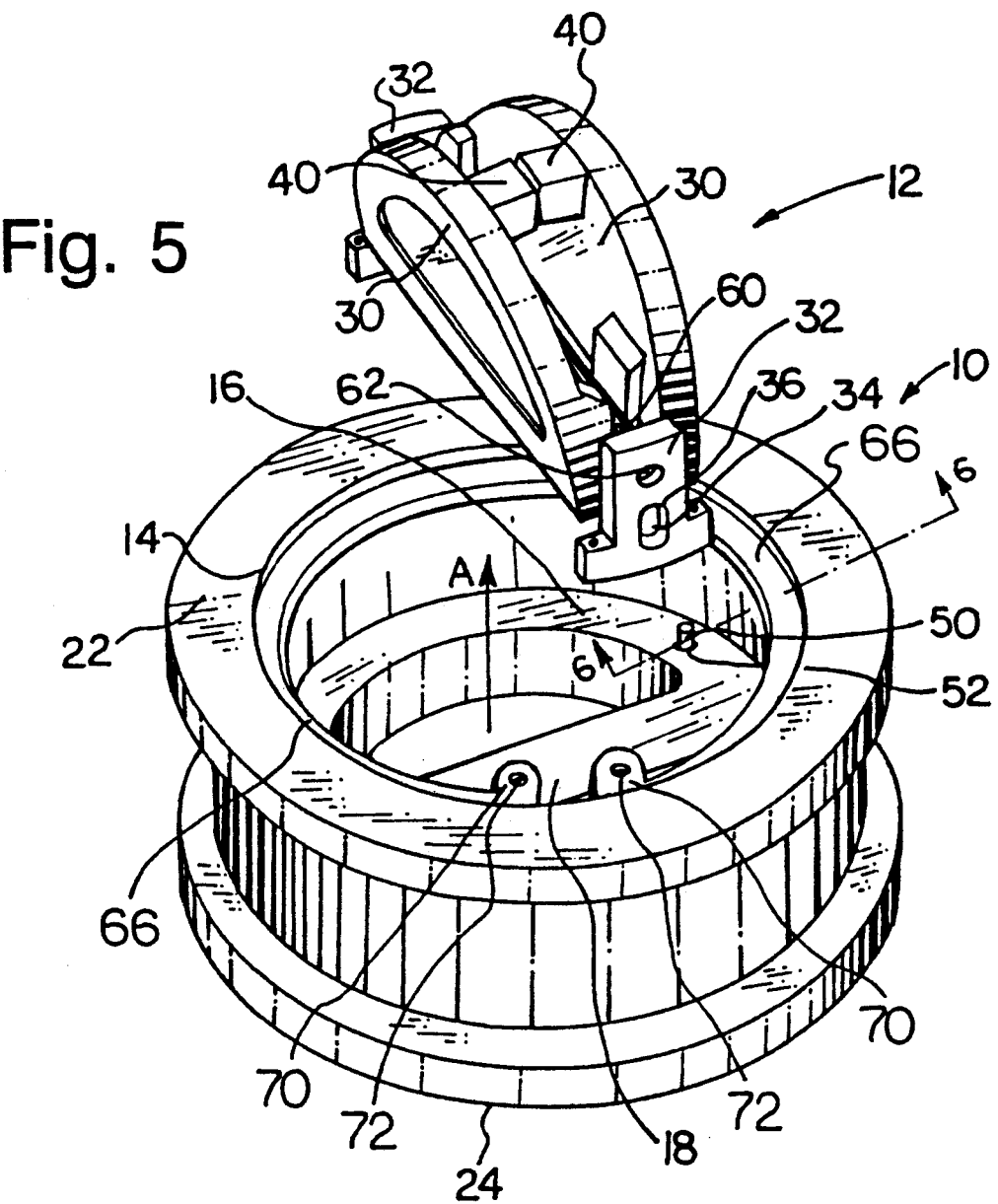
FIG. 5 is an exploded perspective view of an alternative form of valve in accordance with the invention.
Figure 6:
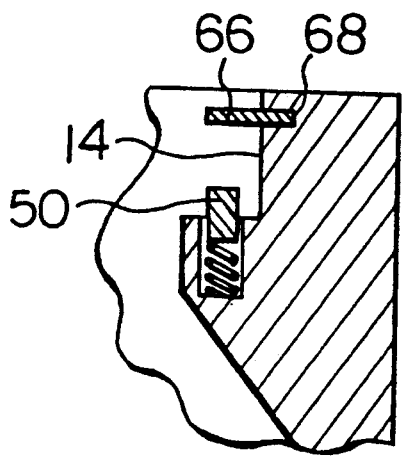
FIG. 6 is a cross-section on the line 6—6 of FIG. 5.

FIGS. 5 and 6 illustrate an alternative embodiment, which is a modification of the embodiment of FIGS. 1 to 4. In this embodiment, a retaining member in the form of a resilient member, of annular form, in the shape of a circular spring, is seated in a groove machined or otherwise formed in the bore. An example of a resilient member is one sold under the trade name Circlip. Generally, the member extends for a major part of the groove and has opposed ends having holes therein. By urging the ends together the member can be inserted into, and removed from, the groove.

To assemble the flapper assembly into the valve body, the member is removed, and the flapper assembly of holding members and flappers is inserted into the bore to rest on the seat. A member is then inserted to retain the holding members against the seat. The pins maintain the holding members against rotation in the bore.

The elongate bores 36 permit movement of the hinge pin, along the axis of the valve, to permit the back edges or "heels" of the flapper members to clear the seat as they rotate to the open position and also back to the closed position. In the event that these bores become worn to an extent that replacement is necessary only the holding members 32 need be replaced.

I claim:
1. A fluid check valve comprising:
a valve body having a bore therethrough, and having a continuous cylindrical surface;
an annular valve seat in said bore;
a flapper assembly positioned in said bore, said flapper assembly comprising:
a pair of substantially semi-circular flapper members;
a pair of spaced holding members positioned on said seat, an elongate slot in each holding member, the axes of said elongate slots parallel to the axis of said bore in said valve body, the outer surface of each holding member of the same profile and having the same cylindrical dimension as said cylindrical surface of said valve body and abutting said cylindrical surface, a hinge pin pivotally mounting said valve members, said hinge pin mounted at each end in said elongate slots;
retaining means extending radially inward in said bore, said holding members extending between said seat and said retaining means; and
locating means on said seat and on at least one of said holding members for alignment of said flapper assembly in said bore.

2. A valve as claimed in claim 1, including stop means for limiting pivotal movement of said flapper members to an open position.

3. A valve as claimed in claim 2, said stop means comprising a stop pin extending between said holding members, said stop pin positioned on the side of said pivot pin remote from said seat.

4. A valve as claimed in claim 1, including locating means comprising at least one pin in said seat, and at least one bore in at least one of said holding means, positioned to accept said pin.

5. A valve as claimed in claim 4, said at least one pin axially movable in a bore in said seat, a resilient means biassing said pin to protrude from said bore in said seat.

6. A valve as claimed in claim 5, including an access hole communicating with said at least one bore in a holding member, for depression of said pin to permit rotation of said flapper assembly in said valve body.

7. A valve as claimed in claim 1, including a stop on each flapper member.

8. A valve as claimed in claim 1, said retaining means comprising two diametrically opposed projections in said bore, said holding members extending between said seat and said projections, and locating means for retaining the flapper assembly with said hinge pin aligned with said projections.

9. A valve as claimed in claim 8, including a transverse member extending diametrically across said bore, at said seat, said transverse member aligned with said projections.

10. A valve as claimed in claim 1, said retaining means comprising a resilient member of annular form positioned in an annular groove in said bore, said holding members extending between said seat and said resilient member.

11. A valve as claimed in claim 10, including a transverse member extending diametrically across said bore, at said seat, and locating means for retaining the flapper assembly with said hinge pin aligned with said transverse member.

* * * * *